UNITED STATES PATENT OFFICE.

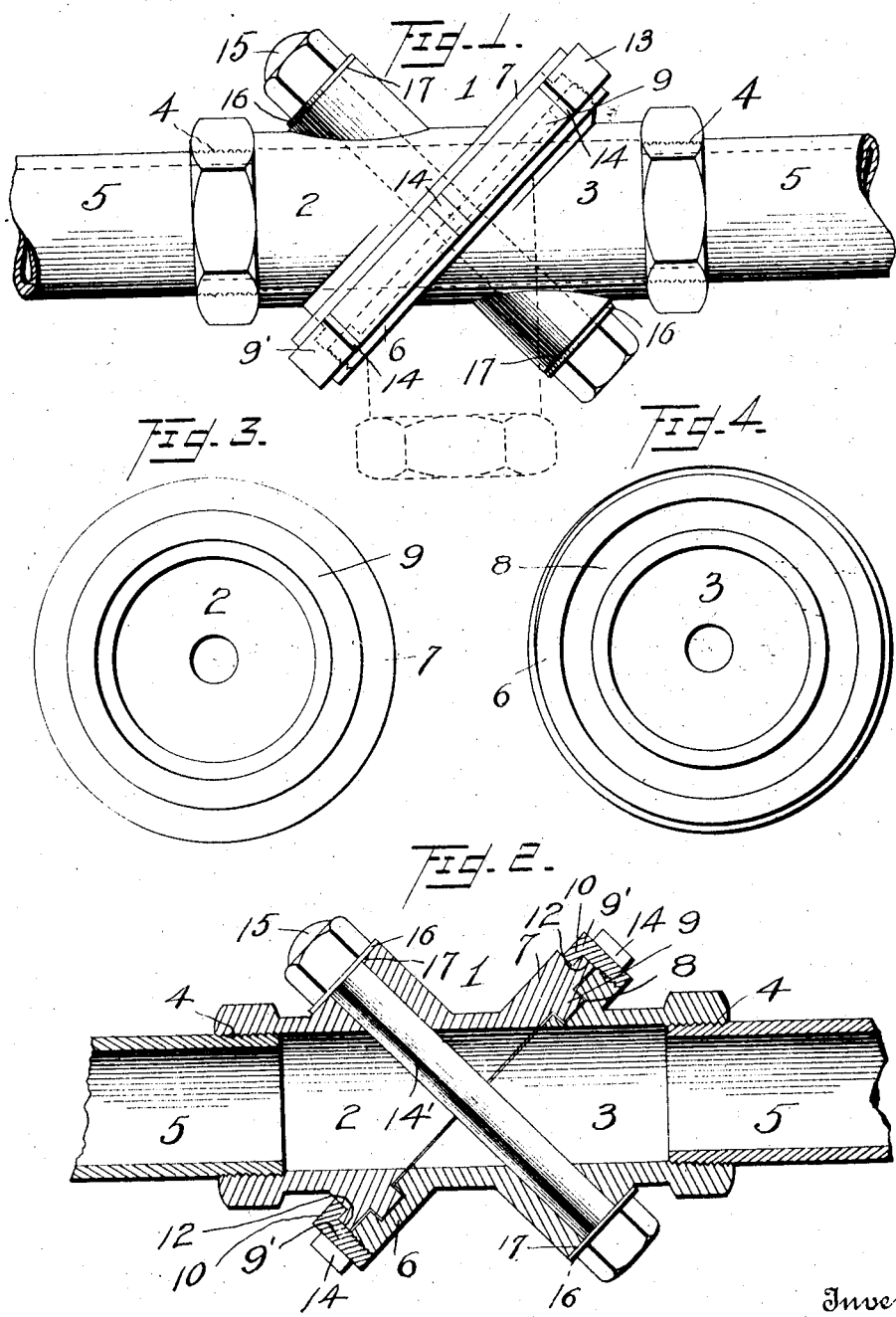

WILLIAM AUSTIN, OF SCRANTON, PENNSYLVANIA.

PIPE-COUPLING.

991,595.

Specification of Letters Patent.

Patented May 9, 1911.

Application filed September 27, 1909. Serial No. 519,722.

*To all whom it may concern:*

Be it known that I, WILLIAM AUSTIN, a citizen of the United States, residing at Scranton, in the county of Lackawanna and State of Pennsylvania, have invented certain new and useful Improvements in Pipe-Couplings; and I do declare the following to be a full, clear, and exact description of the invention, such as will enable others skilled in the art to which it appertains to make and use the same.

My invention relates to pipe couplings and consists of two members having diagonal meeting faces, and continuously alining passages, and a coupling nut binding said faces together, each member having an exterior protuberance, and a bolt passing through said protuberances.

In the accompanying drawings: Figure 1 is a side elevation partly in section of a coupling embodying my improvements, the dotted lines indicating two of the positions which one of the coupling members may assume with relation to the other; Fig. 2 is a central longitudinal section of Fig. 1; Fig. 3 is a perspective view of one of the coupling members; and Fig. 4 is a similar view of the other coupling member.

Referring to the drawings for a more particular description of the invention 1 indicates the coupling consisting of two sleeves 2 and 3, respectively, having internal screw threads 4 in their outer ends adapted to receive the pipes 5 to be coupled. If desired, however, it is evident that the pipes 5 to be coupled may be connected with the outer ends of the coupling sleeves by expanding the pipe ends in the sleeves or by shrinking said sleeves over said pipe ends. The coupling members are provided with diagonally and oppositely disposed inner ends. The inner end of the coupling member 3 is provided with the exteriorly threaded flange 6, while the inner end of the other coupling sleeve 2 is provided with an outwardly extending flange 7 which fits against the flange 6. The face of the flange 6 is provided with an annular groove 8 which receives a corresponding tongue 9 formed on the face of the flange 7. The groove and tongue are suitably ground to provide a fluid-tight fit between them, or if desired, suitable packing may be interposed between the groove and tongue. A coupling nut 9′ screws on the exteriorly threaded flange of the coupling sleeve 3 and is provided at one edge with an inwardly extending flange 10 which fits against the shoulder 12 formed by recessing the inner edge of the shoulder 7. By this construction it will be observed that when the coupling nut 9 is screwed in position the coupling members or sleeves are drawn tightly together. The coupling nut may be provided with a peripheral rim or flange 13 which may be suitably recessed at different points, as at 14, to provide for the use of a spanner wrench in tightening the coupling.

In addition to the means above described for connecting the coupling sleeves together a coupling bolt 14′ is passed through the sleeves preferably at right angles to the inner or meeting ends of the coupling sleeves, and a capped nut 15 screwed on the threaded end of the bolt. Soft copper washers 16 are preferably arranged between the head of the bolt and the nut and the bearing shoulders 17 of the coupling sleeves to prevent any leakage at these points. The coupling bolt is preferably of stay-bolt steel of high tensile strength.

In practice, by unloosening the coupling member 9 either of the coupling sleeves may be turned in either direction to a position at right angles to the other coupling sleeve or to any angle less than a right angle. Owing to this construction my coupling not only serves every function of the ordinary pipe flange coupling, pipe union or elbow, but possesses the added advantages of adaptation to the various angles required in practice, especially in difficult places where any of the above mentioned fittings could not be used.

By the use of my coupling it is possible to run any pipe line in any direction by the shortest practical course and with the least number of abrupt turns and consequently with a less number of lineal feet of pipe. While eliminating the necessity for right angled turns, it provides convenient means for making such connections, if absolutely necessary. It also permits the removal and renewal of any section in the line at any point in the system without pipe cutting or the need for special tools, while the joints may be arranged in a shorter period of time and with less labor than in the ordinary fitting.

It is to be particularly observed that by employing the tongue 9 and the connecting bolt 14′ when the coupling sleeves are bolted together they can not be pulled apart without destroying and overcoming the combined tensile strength of the tongue and bolt.

From the foregoing description, taken in connection with the accompanying drawings, the construction and operation of the invention will be readily understood without requiring a more extended explanation.

I claim as my invention:

A coupling comprising two members having diagonal meeting faces, and continuously alining passages, a coupling nut binding said faces together, each member having an exterior protuberance, and a bolt passing through said protuberances.

In testimony whereof I have hereunto set my hand in presence of two subscribing witnesses.

WILLIAM AUSTIN.

Witnesses:
Wm. P. Brooks,
Ellsworth John.